Patented July 1, 1952

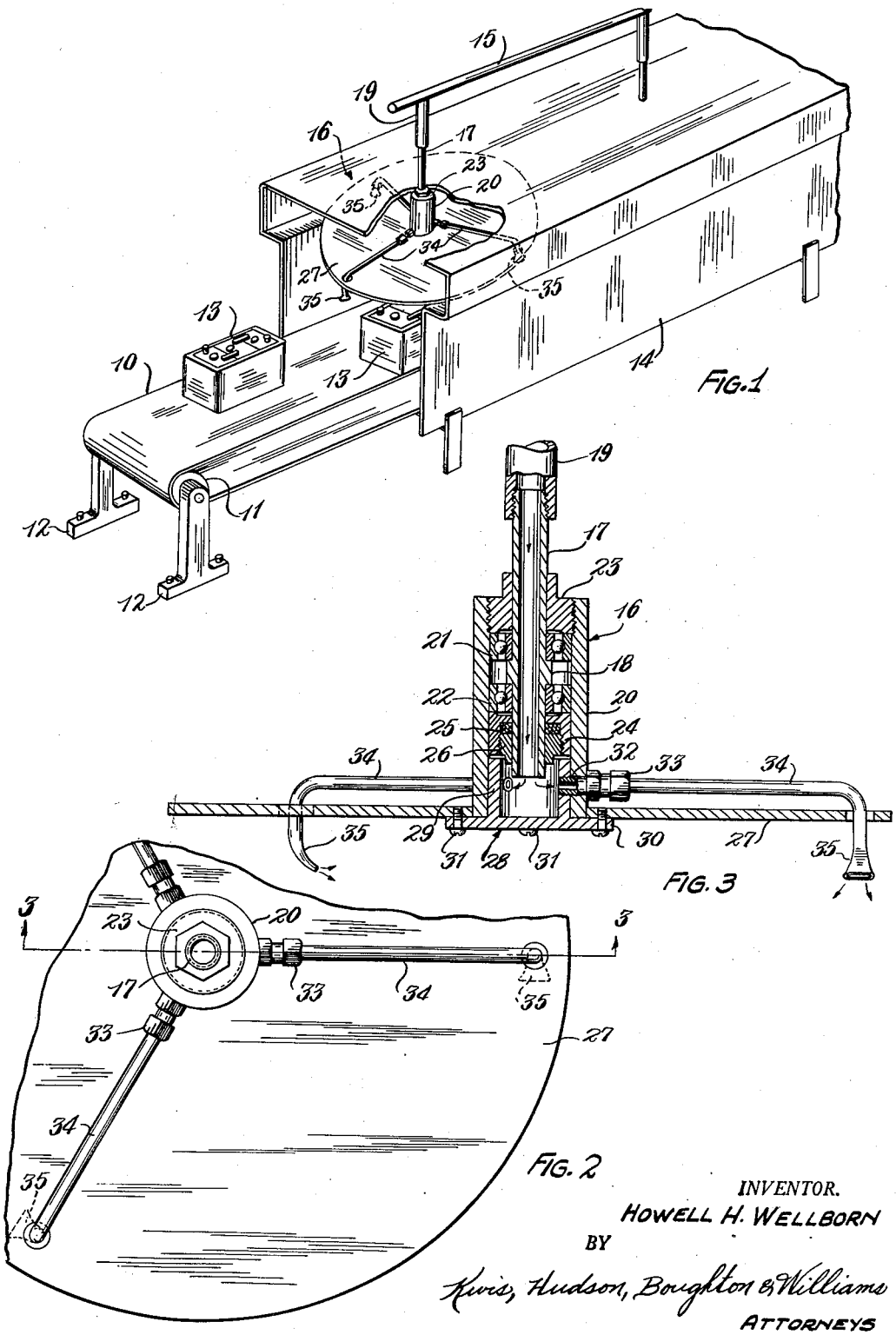

2,602,003

UNITED STATES PATENT OFFICE 2,602,003

ROTATING APPARATUS FOR BLOWING LOOSE FOREIGN MATERIAL FROM ARTICLES

Howell H. Wellborn, Dallas, Tex., assignor to Willard Storage Battery Company, Cleveland, Ohio, a corporation of West Virginia Application October 30, 1946, Serial No. 706,637

2 Claims. (Cl. 299—69)

This invention relates to a cleaning apparatus, and more particularly to a rotatable means employing fluid under pressure for removing drops of water and other foreign material from storage batteries or the like.

In the course of the construction of storage batteries, dust, dirt and other foreign material tend to collect on the casings and tops thereof, and hence it has been the practice to spray the batteries, moving along the assembly line, with water before the batteries are lacquered and painted. Some of this water, and occasionally other foreign matter, tend to cling to the batteries, especially to the tops thereof, and it is, therefore, an object of this invention to provide a novel and improved cleaning apparatus which is adapted to automatically remove water and other foreign material from articles, such as storage batteries or the like while passing along an assembly line.

Another object of the invention is to provide a novel and improved apparatus for cleaning storage batteries or the like while being transported on a conveyor, the apparatus comprising a stationary hood through which a portion of the conveyor passes, and the hood being provided with a rotatable part or parts adapted to conduct streams of fluid under pressure over objects on the conveyor with the rotatable part or parts being revolved by the reaction of the streams of fluid issuing therefrom.

A further object of the invention is to provide an improved cleaning apparatus for storage batteries or the like in which a stationary tube rotatably supports a hollow member to which is connected a plurality of elongated tubes each provided with an angularly disposed and restricted nozzle, the hollow member and elongated tubes being adapted to be rotated by the reaction of fluid which is supplied under pressure to the stationary tube and issues from the nozzles, the stationary member constituting the sole support for the apparatus.

Other objects and advantages of the invention reside in various features of construction, combinations and arrangements of parts as will be more clearly apparent from the following description of the preferred embodiment which is illustrated in the accompanying drawing and in which:

Fig. 1 is a fragmentary perspective view of a conveyor provided with the improved cleaning apparatus of this invention;

Fig. 2 is a fragmentary top elevational view of the improved cleaning or blow-off device per se; and Fig. 3 is a longitudinal sectional view through the improved device taken substantially on the line 3—3 of Fig. 2 and looking in the direction indicated by the arrows.

For the purpose of illustrating the preferred embodiment of the invention, there is shown in Fig. 1 of the drawings a conveyor, which may constitute a portion of an assembly line for storage batteries or the like, and may comprise an endless belt 10 extending about a rotatable drum 11 supported by standards or legs 12, the belt 10 being driven by means not shown. As indicated in Fig. 1, the batteries 13, which have been assembled and preferably sprayed with water to remove dust, dirt and the like prior to lacquering or painting, are carried by the belt 10 through a suitable housing or tunnel-like hood 14 surrounding a portion of the conveyor 10. Positioned above the hood is a supply pipe 15 for conducting compressed air, or other fluid under pressure, to the improved cleaning or blow-off device, generally indicated 16, one or more of which may be mounted at spaced points within the hood.

The blow-off device comprises a hollow spindle or tube 17 having an annular shoulder 18 intermediate its ends, the upper end of the spindle or tube being threaded for connection with a branch 19 of the supply pipe 15. Surrounding the spindle or tube is a hollow body or sleeve member 20, which is rotatably supported upon the tube by suitable bearings 21 and 22. As here illustrated, the bearings are of the ball type, the outer races of which have a tight fit in the sleeve or member 20, and the inner races of which are respectively positioned upon the tube 17 on opposite sides of the annular shoulder 18. A suitable retaining nut 23 is slipped over the upper end of the tube 17, prior to the connection of the latter with the branch pipe 19, and is threaded into the upper portion of the sleeve or body member 20 to retain the upper bearing 21 in engagement with the shoulder 18. A packing ring 24, having a tight fit within the sleeve or body 20, is positioned with one end face thereof in engagement with the lower bearing 22, the said packing ring having a bore therethrough to receive the lower end of tube 17, the bore being countersunk to receive packing material 25. A gland nut 26 is slipped over the lower end of the tube 17 and threaded into the lower end of the countersunk bore of the packing ring 24, thereby retaining the packing 25 in sealing engagement about the spindle while permitting relative rotation therebetween.

An annular plate 27, having a central opening therein, is slipped over the lower end of the sleeve 20 and a bushing or cap member 28 having an upstanding cylindrical flange 29 and an annular flange 30, is connected with the plate 27 by fastening means such as screws 31, the cylindrical flange 29 being fitted within the lower end of the member 20. The lower portion of the sleeve or body member 20 is provided with a plurality of circumferentially spaced openings aligned with correspondingly spaced tapped holds in the cylindrical flange of the cap member 28 and a nipple 32 is inserted through each of the spaced openings of the sleeve 20 and threadedly received in the tapped openings of the cylindrical portion 29 of the cap member.

The outer end of each nipple 32 is connected by a union 33 with a radially extending elongated pipe 34, each of which has its outer end bent at substantially right angles and inserted through a suitable opening adjacent the periphery of the plate 27. The lower ends of the pipes 34 are preferably provided with restricted nozzle portions 35, which are directed substantially tangentially of the plate 27 and angularly, downwardly with respect thereto. These nozzle members may be separate elements connected with the pipes 34 or may be formed integrally therewith by bending and constricting the lower ends of the pipe in the manner illustrated in Fig. 3.

The assembly just described, comprising the cleaning or rotary blow-off device, is inserted in the housing or hood 14 with the plate 27 substantially parallel with the top surface of the conveyor belt 10 and elevated thereabove sufficiently to provide clearance between the batteries 13 and the nozzles 35, the tube 17 projecting through an opening in the top of the housing or hood 14. The outer end of the tube 17 is then connected to the branch 19 of the pipe or conduit 15.

It will now be readily apparent that when compressed air or other fluid under pressure is supplied to the conduit 15, the fluid will flow through the hollow interior of the tube 17 into a chamber formed at the lower end of the tube by the cylindrical flange 29, and thence through the pipes 34 and the nozzles 35, as indicated by the arrows in Fig. 3. The air or other fluid thus issuing from the nozzles 35 will be directed upon the batteries or other objects 13 carried by the belt 10, thereby dislodging drops of water or other foreign material thereupon which will be blown to the sides of the housing or hood 14 and may be removed therefrom by suitable outlets not shown. It will also be apparent that since the nozzles 35 are angularly and tangentially disposed with respect to the plate 27, the air or other fluid issuing from the said nozzles will cause the plate 27, the pipes 34, and the sleeve or body member 20 to rotate about the tube 17 in the well known manner characteristic of garden sprinklers. This rotary motion enables the compressed air or other fluid to sweep over the battery or other objects 13 in the manner such that water and other foreign material clinging thereto will be rapidly removed therefrom; and, since the device rotates by virtue of the reaction of the fluid issuing from the nozzles, it will function without the presence or attention of an operator.

It should be observed that the plate 27 not only serves to support the rotating tubes, but also assists in directing the streams of fluid issuing therefrom onto the batteries or other objects therebeneath so that the said streams are not dissipated in an upward direction.

While a preferred embodiment of the invention has been described in considerable detail, it will be apparent that various modifications and changes therein can be made by one skilled in the art. For example, one or more of the cleaning or blow-off devices may be employed as desired, and with or without an accompanying housing or hood. Also, the device is capable of operation with objects which are not moved upon a conveyor belt or the like. Moreover, the device need not be mounted with the plate 27 thereof disposed in a horizontal position, as indicated, but may be located as required by the environment or the nature of the articles to be cleaned. Furthermore, any desired number of tubes 34 and nozzles 35 may be employed and, when more than one such tube and nozzle is used, the spacing therebetween may be either uniform or nonuniform. Other adaptations and alterations will be apparent to one skilled in the art and, therefore, the invention is to be limited only as required by the spirit and scope of the appended claims.

Having thus described my invention, I claim:

1. An apparatus of the character described comprising a stationary tube, a hollow member having a chamber therein, bearing means carried by said tube and hollow member to rotatably support the latter on the former with the lower end of said tube communicating with said chamber and terminating therein, sealing means carried by said member and surrounding said tube adjacent its lower end, a plurality of spaced openings through the wall of said chamber, a plate member attached to the lower end of said rotatable member, a plurality of elongated tubes each having one end connected to one of said spaced openings respectively, the said elongated tubes extending substantially radially with respect to the axis of the stationary tube and said plate member and having their outer ends angularly disposed to pass through spaced openings in said plate member, the said outer ends of said elongated tubes being further angularly disposed on the other side of said plate and each provided with a restricted nozzle portion, and means to supply fluid under pressure to the said stationary tube.

2. An apparatus of the character described comprising a stationary tube having an annular shoulder on the exterior thereof intermediate its ends, a hollow member having a chamber therein, bearing means cooperating with said hollow member and said annular shoulder on said tube to rotatably support the member on the tube with the lower end of said tube communicating with said chamber and terminating therein, sealing means carried by said member and surrounding said tube below the said shoulder and adjacent the lower end of the tube, a plurality of spaced openings through the wall of said chamber, a plurality of elongated tubes extending substantially radially with respect to the axis of the stationary tube and each provided with a restricted and angularly disposed nozzle portion at its other end, a circular plate member on the lower end of said hollow member, the said plate member being provided with a plurality of spaced openings adjacent its periphery through which the nozzle portions of said elongated tubes extend, and means to supply fluid under pressure to the said stationary tube.

HOWELL H. WELLBORN.

(References on following page)

REFERENCES CITED

The following references are of record in the file of this patent:

UNITED STATES PATENTS

| Number | Name | Date |
|---|---|---|
| 457,674 | Simmons | Aug. 11, 1891 |
| 1,466,450 | Kothe | Aug. 28, 1923 |
| 1,697,879 | Olson | Jan. 8, 1929 |
| 1,711,763 | White | May 7, 1929 |
| 1,723,014 | Dahllof | Aug. 6, 1929 |
| 2,090,406 | Thomason | Aug. 17, 1937 |
| 2,203,029 | Partridge | June 4, 1940 |
| 2,218,686 | Showers | Oct. 22, 1940 |
| 2,325,023 | Allred | July 27, 1943 |
| 2,326,525 | Diwoky | Aug. 10, 1943 |
| 2,330,124 | James | Sept. 23, 1943 |
| 2,418,045 | Neider | Mar. 25, 1947 |